United States Patent
Kato et al.

[11] Patent Number: 5,251,046
[45] Date of Patent: Oct. 5, 1993

[54] HIERARCHY ENCODING SYSTEM OF MULTI-LEVEL IMAGE THROUGH DITHER CONVERSION

[75] Inventors: Hisaharu Kato; Toshiaki Endo, both of Tokyo, Japan

[73] Assignee: Kokusai Denshin Denwa Co., Ltd., Tokyo, Japan

[21] Appl. No.: 851,040

[22] Filed: Mar. 11, 1992

[30] Foreign Application Priority Data

Mar. 12, 1991 [JP] Japan .................................. 3-70346

[51] Int. Cl.⁵ .............................................. H04N 1/41
[52] U.S. Cl. ........................................ 358/457; 358/429
[58] Field of Search .............. 358/455, 456, 457, 458, 358/429, 136, 298, 426, 427, 428; 382/50

[56] References Cited

U.S. PATENT DOCUMENTS

| | | | |
|---|---|---|---|
| 4,905,294 | 2/1990 | Sugiura et al. | 382/50 |
| 4,924,509 | 5/1990 | Yokomizo | 382/50 |
| 4,947,259 | 8/1990 | Katsuta | 358/429 |
| 5,067,027 | 11/1991 | Yano | 358/457 |

FOREIGN PATENT DOCUMENTS 376679 4/1990 European Pat. Off.
63-132572 6/1988 Japan.
63-132573 6/1988 Japan.

*Primary Examiner*—Edward L. Coles, Sr.
*Assistant Examiner*—Kim Yen Vu
*Attorney, Agent, or Firm*—Nikaido, Marmelstein, Murray & Oram

[57] ABSTRACT

A multi-level image is encoded through dither conversion and hierarchy encoding with high image compression ratio and satisfactory image quality for low resolution images. An original multi-level image is first reduced so that a plurality of reduced images are obtained. Each reduced multi-layer image is then dithered to bi-level image, and finally each dithered bi-level image is encoded starting the smallest and the lowest resolution image to the largest and the highest resolution image. No temporary memory for reduced multi-level image is necessary, as a common multi-level line memory (LM2, LM3, LM4) doubles for storing a reduced multi-level image and a temporary memory for effecting dither conversion.

3 Claims, 5 Drawing Sheets

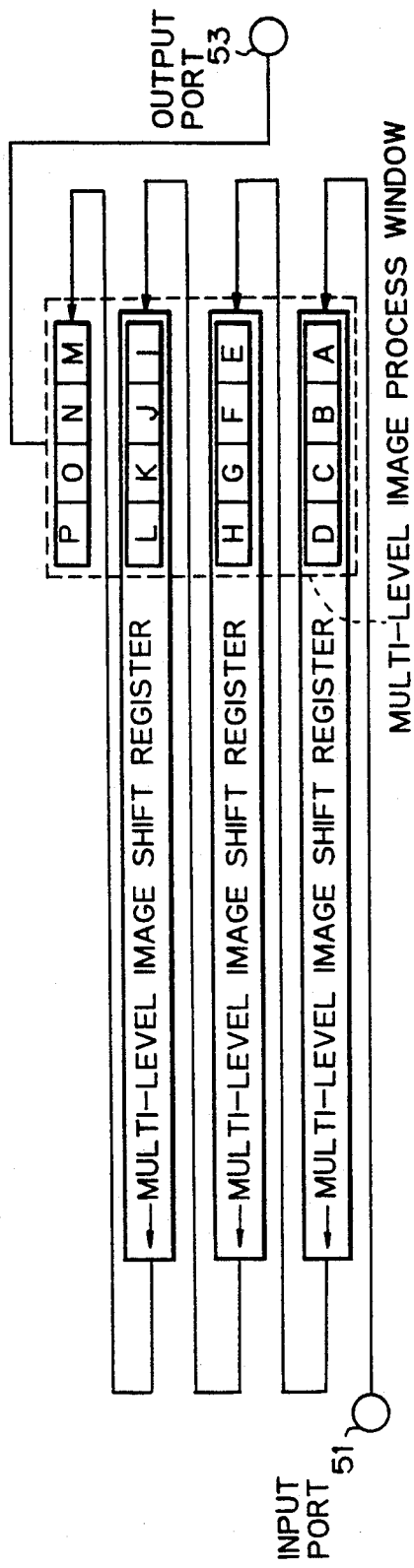
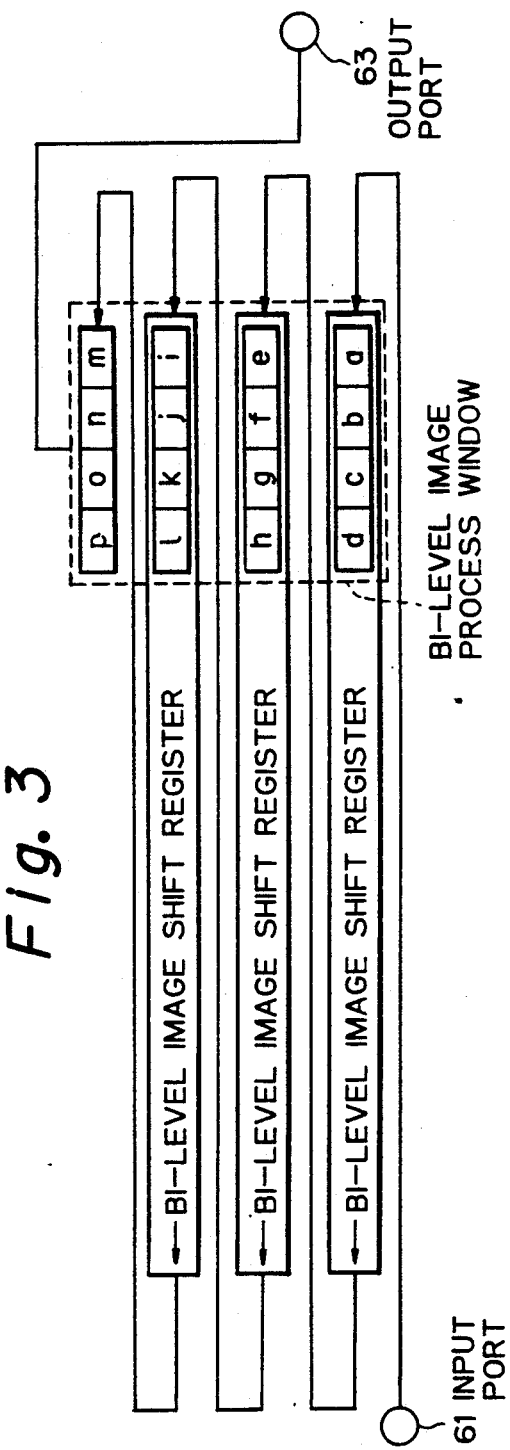

Fig. 4

| P | O | N | M |
|---|---|---|---|
| L | K | J | I |
| H | G | F | E |
| D | C | B | A |

Fig. 5

| 1 | 2 | 1 |
|---|---|---|
| 2 | 4 | 2 |
| 1 | 2 | 1 |

Fig. 6

| 0 | 0 | 1 | 3 |
|---|---|---|---|
| 0 | 1 | 3 | 5 |
| 1 | 3 | 5 | 7 |
| 3 | 5 | 7 | Z |

Fig. 7
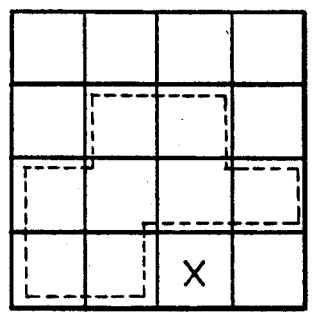 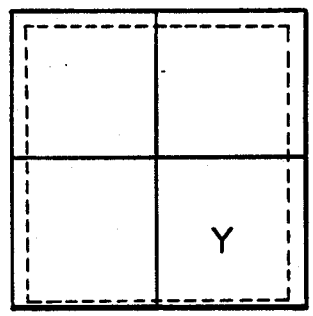
ENCODED BI-LEVEL IMAGE ON CM1    ENCODED BI-LEVEL IMAGE ON CM2
[ ] : REFERENCE PIXELS
X : LOCATION OF PIXEL TO BE ENCODED
Y : PIXEL OF REDUCED IMAGE RELATED TO PIXEL TO BE ENCODED
Fig. 8
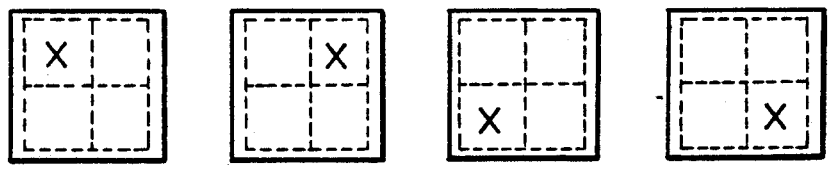
☐ : REDUCED BI-LEVEL IMAGE PIXEL (Y IN Fig.7)
[ ] : ENCODED BI-LEVEL IMAGE PIXEL
X : LOCATION OF PIXEL TO BE ENCODED

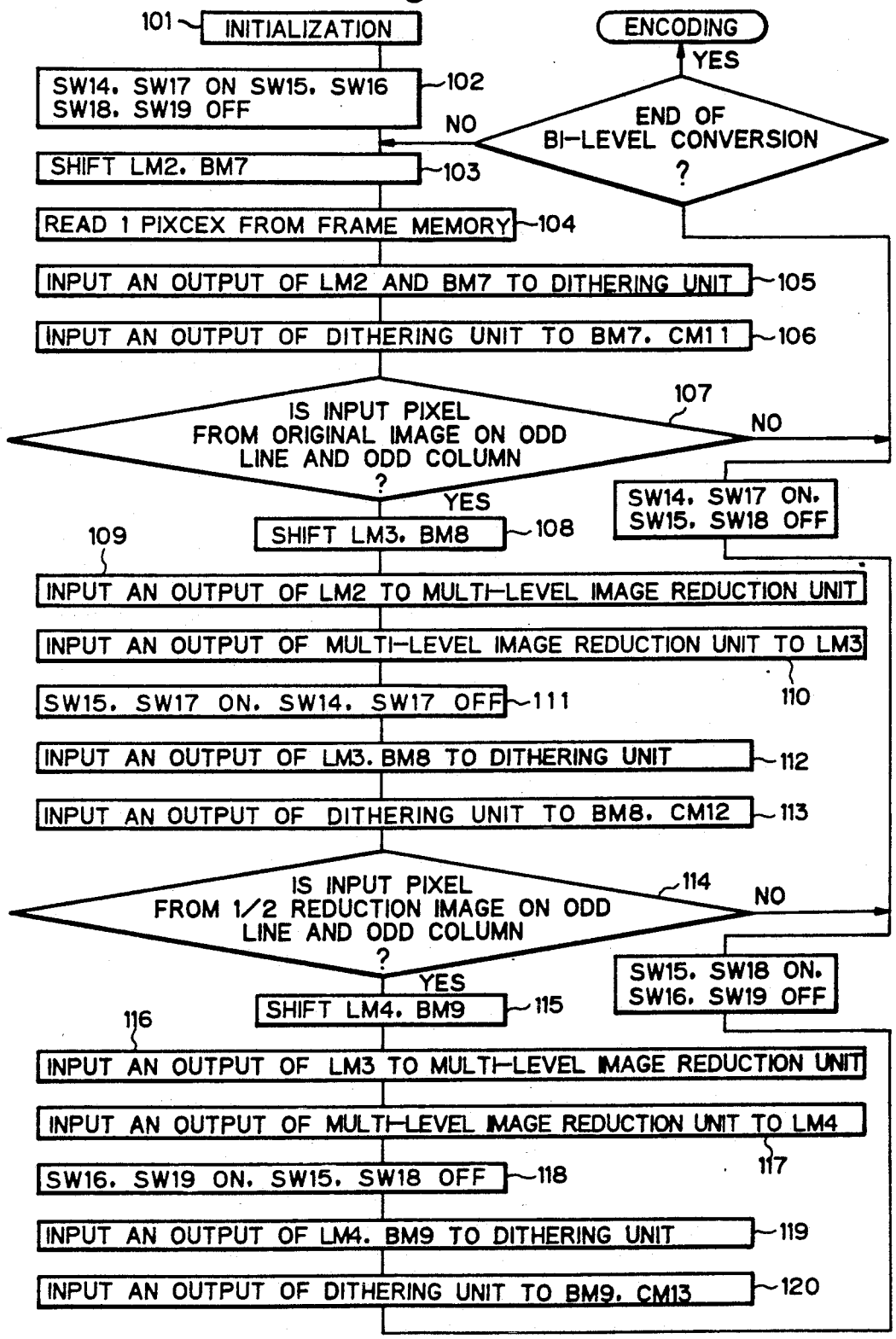

HIERARCHY ENCODING SYSTEM OF MULTI-LEVEL IMAGE THROUGH DITHER CONVERSION

BACKGROUND OF THE INVENTION

The present invention relates to a still picture communication system, in particular, relates to a hierarchy coding system of a still picture.

In a conventional facsimile system, a picture is encoded in a scanning manner so that each scanning line is encoded from top to bottom of a picture. In that system, almost all the coded data must be forwarded to a receive side, and therefore, it takes long time for transmission. When a picture data base is considered, that scanning system is unefficient in storing a picture, and/or retrieving a picture.

Another conventional system is a hierarchy encoding system, in which a bi-level image is progressively encoded beginning with a low resolution for a compressed image to subsequent doublings of resolution for an enlarged image.

In case of a dithering image which is conventionally used in printing or transmitting a picture, a multi-level image is first processed to be a dithered bi-level image, and the bi-level image is reduced to a low resolution image for hierarchy, and the each bi-level image is encoded starting from the lower resolution.

However, a prior hierarchy dithering encoding system has the disadvantage that a picture quality is poor in a low resolution image. That is because an image is first bi-leveled through dithering, and then, a dithered image is processed to hierarchy encoding by compressing the size of an image.

SUMMARY OF THE INVENTION

It is an object, therefore, of the present invention to overcome the disadvantages and limitations of a prior hierarchy encoding system by providing a new and improved hierarchy encoding system.

It is also an object of the present invention to provide a hierarchy encoding system for dithering image with high image compression ratio, and high image quality in low resolution.

The above and other objects are attained by a hierarchy encoding system of dithered image comprising; a multi-level image frame memory (1) for storing a frame of an original input image with multi-levels; a plurality of multi-level line memories (LM2, LM3, LM4) coupled with said frame memory (1), each of said line memories having capacity of several lines of an image, and each of said line memories storing a part of an input image in full size manner and reduced manner; a dithering unit (5) for converting content of each of said line memories to bi-level dithering image; a multi-level image reduction unit (6) for reducing a multi-level image stored in said line memories (LM2, LM3, LM4); a first group of switches (SW14, SW15, SW16) for selectively coupling said line memories to said dithering unit and said reduction unit; a plurality of bi-level line memories (BM7, BM8, BM9) for storing dithered images which relate to said multi-level image line memories; a second group of switches (SW17, SW18, SW19) for selectively coupling said dithering unit (5) with said bi-level line memories; a plurality of coding memories (CM11, CM12, CM13) for storing a frame of dithered images relating to said bi-level line memories; an encoding unit (10) for effecting hierarchy encoding for images stored in said coding memories beginning the lowest resolution image to higher resolution images; a third group of switches (SW20, SW21, SW22) for selectively coupling outputs of said coding memories with said encoding unit; wherein an original multi-level image is first reduced so that a plurality of reduced multi-level images are obtained in said multi-level line memories, each layer of reduced multi-level image is dithered to bi-level images which are stored in said bi-level line memories, and dithered bi-level images are encoded through differential encoding manner

BRIEF DESCRIPTION OF THE DRAWINGS

The foregoing and other objects, features, and attendant advantages of the present invention will be appreciated as the same become better understood by means of the following description and accompanying drawings wherein;

FIG. 2 is a block diagram of LM2, LM3 and LM4 in FIG. 1, FIG. 3 is a block diagram of BM7, BM8, and BM9 in FIG. 1, FIG. 4 shows an output of a multi-level image process window which is used in reducing an image resolution, FIG. 5 shows a weightening pattern which is used in reducing an image resolution, FIG. 6 shows a weightening pattern for an output of a line memory for dithering encoding process, FIG. 7 shows the relations of an image pixel which is subject to coding, and a reference pixel, FIG. 8 shows the location of compressed pixels, and FIG. 9 shows an operational flow chart for reducing and encoding an image according to the present invention.

DESCRIPTION OF THE PREFERRED EMBODIMENTS

Figure 1:
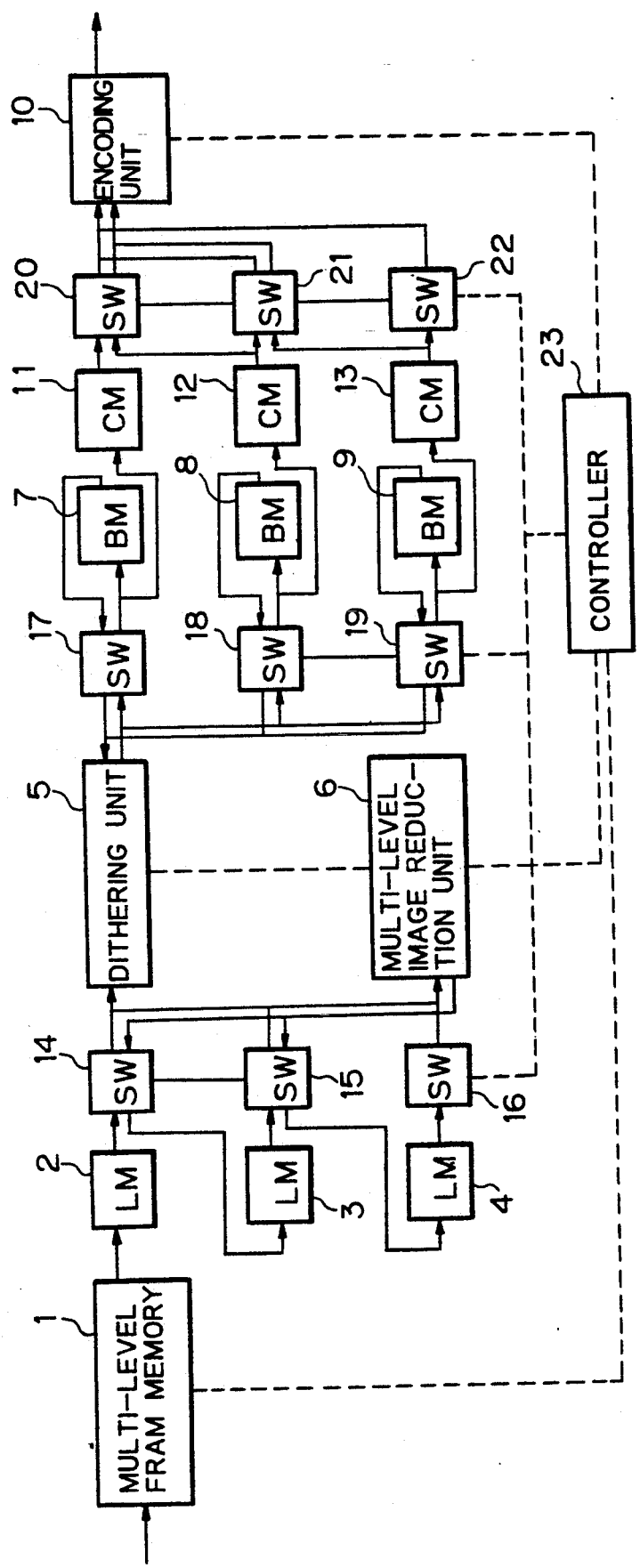
FIG. 1 is a block diagram of a hierarchy encoding system according to the present invention.

FIG. 1 shows a block diagram of the hierarchy encoding system according to the present invention. FIG. 1 shows the embodiment of three stages hierarchy encoding. In the figure, the numeral 1 is a frame memory which stores a frame of an input image in multi-level form, 2, 3 and 4 are line memories (which is indicated by LM hereinafter) storing several lines of an image of an original image, a half reduced (or compressed) image, and a quarter reduced image, respectively. The numeral 6 is an image reduction unit for reducing an image. The image reduction unit 6 is coupled with the line memories (LM2, LM3) 3 and 4 when the switch 14 is in ON state, so that the image in the line memory LM2 is reduced, and the reduced image is stored in the line memory LM3. Similarly, when the switch 15 is in ON state, the image reduction unit 6 is coupled with the line memories LM3, LM4 so that the image in the line memory LM3 is reduced and the reduced image is stored in the line memory LM4.

The numerals 7, 8 and 9 are line memories for storing dithered bi-level images in the line memories LM2, LM3, LM4, respectively. The dithered memories are denoted by BM7, BM8 and BM9. The numerals 11, 12 and 13 are frame memories for storing a frame of dithered bi-level images in the line memories LM2, LM3 and LM4, respectively. The numeral 5 is a dithering unit for providing dithered image. When the switches 14 and 17 are in ON state, the dithering unit 5 is coupled with the line memories LM2, and LM7, and the frame memory CM11 so that the multi-level image in the line memory LM2 is converted to a dithered bi-level image which is stored in the line memory BM7 and the frame memory CM11. Similarly, when the switches 15 and 18 are in ON state, the line memory LM3 is coupled with the line memory BM8 and the frame memory CM12 so that the multi-level image in the line memory LM3 is dithered, and the dithered image is stored in the line memory BM8 and the frame memory CM12. Further, when the switches 16 and 19 are in ON state, the line memory LM4 is coupled with the line memory BM9 and the frame memory CM13 so that the multi-level image in the line memory LM4 is dithered and the dithered image is stored in the line memory BM9 and the frame memory CM13.

The numeral 10 is an encoder, which encodes the bi-level image in the frame memories CM11 and CM12 when the switch 20 is in ON state. Similarly, when the switch 21 is in ON state, the encoder 10 encodes the bi-level image in the frame memories CM12 and CM13. When the switch 22 is in ON state, the image in the frame memory 13 is encoded as the first level hierarchy image.

FIG. 2 shows the structure of the line memories LM2, LM3 and LM4 in FIG. 1. An input port 51 receives a multi-level image data which has 8 bits for each pixel for every image pixel. A multi-level image data which are previously stored in the line memory are shifted by 8 bits in the multi-level shift registers in left direction. Each shift register has the capacity of one line of an input image. The multi-level image process window 52 operates to output 4×4 pixels (A,B,C,D,E,F,G,H,I,J,K,L,M,N,O,P in the embodiment) in the shift registers. The process window 52 functions essentially to scan a plurality of lines of an image in a scanning direction. The input port 51 is coupled with the multi-level frame memory 1 as to the line memory LM2, and coupled with the reduction unit 6 as to the line memories LM3 and LM4. The output data of the process window 52 is supplied to the multi-level image reduction unit 6 and the dithering unit 5 through the weighting circuit (not shown), and the output port 53.

FIG. 3 shows the configuration of BM7, BM8 and BM9 in FIG. 1. The input port 61 receives the bi-level image data (one bit) in every image pixel. The image data which is previously stored in the line memories are shifted by one bit in left direction in every input of an image pixel. Each shift register has the capacity of one line of an input image. The bi-level image process window 62 operates to transfer 4×4 pixels (a,b,c,d,e,f,g,h,i,j,k,l,m,n,o,p in the embodiment) to the output port 63. The process window 62 functions essentially to scan a plurality of lines on an image. The input port 61 is coupled with the output of the dithering unit 5 as to the line memories BM7, BM8 and BM9. The output of the process window 62 is supplied to the dithering unit 5 and the coding unit 10 through the output port 63.

The multi-level image reduction unit 6 carries out the average process for the portion enclosed by the dotted line in FIG. 4 among the output of LM2 or LM3, by weighting them with the weighting factors as shown in FIG. 5. The result is forwarded to the input port of LM3 or LM4. The average process is carried out only when the center pixel F locates on an odd column and on odd line in the original image which is subject to reduction. The output MEAN of the average process is shown by the following equation (1).

$$MEAN = [F \times 4 + (B+ +G+J+) \times 2 + (A+C- +I+K+)]/16 \quad (1)$$

The dithering unit 5 determines the binary level of the pixel at the location A in the multi-level image process window, by accepting the outputs of the multi-level image process window and the bi-level image process window, by using the weighting factors shown in FIG. 6. The location Z corresponds to the location A in the multi-level image process window, and the location A in the bi-level image process window. The determined binary level BIN is given by the following equation (2).

$$\begin{aligned}
&graytemp = (B+E) \times 7 + (C+ -F+I) \times 5 + (D+G+J+M) \times 3 + H + K + N \\
&bintemp = (b+e) \times 7 + (i+c+f+i) \times 5 + (d+g+j+m) \times 3 + h + k + n \\
&diffmean = (graytemp - bintemp \times 255)/44 \text{ If} \\
&A + diffmean < 128 \text{ then } BIN = 0 \text{ If } A + diffmean \\
&\geq 128 \text{ then } BIN = 0
\end{aligned} \quad (2)$$

where A through P take one of values between 0 and 255. The value of a through p is 0 (white) or 1 (black).

The dithered output BIN is stored in the location A in the bi-level image process window. That dithered output BIN is the input to the line memories BM7, BM8 and BM9.

The coding unit 10 carries out the hierarchy encoding by using the outputs of the frame memories CM11 and CM12 with the switch SW20 in ON state.

First, the average value MH of the area enclosed by the dotted line in CM11 in FIG. 7, and the average value ML of the area enclosed by the dotted line in the reduced image of CM12 in FIG. 8 are obtained. Then, the difference S of MH and ML is calculated as the inter-hierarchy information which has two bits calculated by the equation (3).

$$S = ML - MH \quad (3)$$

Scope of S Pattern of two bits

| Scope of S | Pattern of two bits |
|---|---|
| −1.0 ≦ S < −0.5 | 00 |
| −0.5 ≦ S < 0.0 | 01 |
| 0.0 ≦ S < 0.5 | 10 |
| 0.5 ≦ S < 1.0 | 11 |

The pixel X is encoded by using said two bits, and 8 bits of context information which has been already encoded as reference pixels. The context information is shown by the dotted line in FIG. 7. Thus, the context information has 10 bits. The encoding system may be conventional arithmetic encoding, in which a pixel X is predicted by using the reference pixels, a positive symbol in which the prediction is correct and a negative symbol in which the prediction is in error are defined, and the encoding is carried out by inputting reference information and the pixel X which is subject to encoding.

The hierarchy encoding of the images in the memories CM12 and CM13, is carried out similarly.

The first step of hierarchy encoding is carried out by encoding the content of the memory CM13 with the switch SW22 in ON state. The context information in that case is 8 pixels shown in FIG. 7.

The encoding is carried out after the bi-level images of all the hierarchy are generated, and the encoding is carried out beginning the first layer low resolution image to higher resolution images.

The controller 23 operates the switches SW14, through SW22 so that the line memories and the frame memories are switched, and said controller 23 controlls the operation of each units.

FIG. 9 shows the operational flow-chart showing the steps of reduction of an image and dithering.

An input original image is input to the multi-level image frame memory together with margin pixels which are provided at the peripheral of the original image. The margin pixels in the embodiment have two lines with the pixel value 0. All the line memories and the frame memories are initialized to zero (step 101).

The switches SW14 and SW17 are turned to ON so that LM2, BM7 and CM11 are coupled with the dithering unit 5 and the multi-level image reduction unit 6 (step 102).

The contents of the line memories LM2 and BM7 are shifted to prepare to accept image input into the same (step 103).

One image pixel is read out of the multi-level image frame memory 1 to the line memory LM2 (step 104).

The content in the process window of the LM2 and BM7 is forwarded to the dithering unit 5 (step 105).

The dithered bi-level image from the dithering unit 5 is forwarded to BM7 and CM11 (step 106).

If the image pixel from the multi-level image frame memory 1 is on the odd line and odd column in the original image, the step goes to the next step 108, otherwise, said steps 103 through 106 are repeated (step 107).

The content of the line memories LM3 and BM8 is shifted for the preparation of the input of images (step 108).

The output of the line memory LM2 is forwarded to the multi-level image reduction unit 6 (step 109).

The reduced image value from the multi-level image reduction unit 6 is input into the line memory LM3 (step 110).

The switches SW15, and SW18 are turned ON so that LM3, BM8 and CM12 are coupled with the dithering unit 5 and the multi-level image reduction unit 6 (step 111).

The value of the process window of LM3 and BM8 is input to the dithering unit 5 (step 112).

The bi-level image value from the dithering unit 5 is input to BM8 and CM12 (step 113).

If the reduced image applied to the line memory LM3 is on the odd line and odd column in the half reduced image, the step goes to the next step 115, otherwise, said steps 103 through 113 are repeated (step 114).

The content of the line memories LM4 and BM9 is shifted for the preparation of the input of an image into those line memories (step 115).

The output of LM3 is applied to the multi-level image reduction unit 6 (step 116).

The reduced image value from the multi-level image reduction unit 6 is applied to the line memory LM4 (step 117).

The switches SW16 and SW19 are turned ON so that LM4, BM9 and CM13 are coupled with the dithering unit 5 and the multi-level image reduction unit 6 (step 118).

The value of the process window of LM4 and BM9 is applied to the dithering unit 5 (step 119).

The bi-level value from the dithering unit 5 is applied to BM9 and CM13 (step 120).

The above steps are repeated until the bi-level image of all the hierarchy is obtained.

A reduced image is generated by processing an original image by using a low pass filter. Of course, another reduction system is available in the present invention.

The dithering process is carried out by using an error diffusion system, and another dithering method such as a systematic dithering method is available in the present invention.

The context information is the value of reference pixels of higher layer, and the difference between the average concentration of an area in a higher layer and that of a lower layer. As a modification, a context information of a lower layer can be used.

As for encoding system, not only arithmetic encoding system, but also another Markof code such as Haffmann code are available.

As mentioned above in detail, according to the present invention, a dithered image is encoded with high image compression ratio, and high image quality in low resolution layer.

Further, it should be appreciated that no multi-level frame memory is used for a reduced multi-level image, as no multi-level reduced image is generated by dithering and reduction are carried out simultaneously. Therefore, bi-level hierarchy image is obtained only by using line memories.

From the foregoing, it will now be apparent that a new and improved hierarchy encoding system of dithered image has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A hierarchy encoding system of dithered image comprising;
   a multi-level image frame memory (1) for storing a frame of an original input image with multi-levels,
   a plurality of multi-level line memories (LM2, LM3, LM4) coupled with said frame memory (1), each of said line memories having capacity of several lines of an image, and each of said line memories storing a part of an input image in full size manner and reduced manner,
   a dithering unit (5) for converting content of each of said line memories to bi-level dithering image,
   a multi-level image reduction unit (6) for reducing a multi-level image stored in said line memories (LM2, LM3, LM4),
   a first group of switches (SW14, SW15, SW16) for selectively coupling said line memories to said dithering unit and said reduction unit,
   a plurality of bi-level line memories (BM7, BM8, BM9) for storing dithered images which relate to said multi-level image line memories,
   a second group of switches (SW17, SW18, SW19) for selectively coupling said dithering unit (5) with said bi-level line memories, a plurality of coding memories (CM11, CM12, CM13) for storing a frame of dithered images relating to said bi-level line memories, an encoding unit (10) for effecting hierarchy encoding for images stored in said coding memories, beginning lowest resolution image to higher resolution images, a third group of switches (SW20, SW21, SW22) for selectively coupling outputs of said coding memories with said encoding unit, wherein an original multi-level image is first reduced so that a plurality of reduced multi-level images are obtained in said multi-level line memories, each layer of reduced multi-level image is dithered to bi-level images which are stored in said bi-level line memories, and dithered bi-level images are encoded through differential encoding manner.

2. A hierarchy encoding system according to claim 1, wherein said encoding unit (10) encodes a pixel X by using reference information of the pixels at location X in previous layers, and pixels adjacent to the pixel X in current layer.

3. A hierarchy encoding system according to claim 1, wherein said encoding unit (10) encodes a pixel X by using average concentration of adjacent pixels to the pixel X in previous layers, and average concentration of adjacent pixels to the pixel X in current layer.

* * * * *